United States Patent Office 3,162,751
Patented Dec. 22, 1964

3,162,751
WELDING ELECTRODE
Lawrence Robbins, 626 Lockwood Drive, Vallejo, Calif.
No Drawing. Filed Sept. 24, 1962, Ser. No. 225,836
14 Claims. (Cl. 219—137)

This is a continuation-in-part of application Serial No. 863,114 filed December 31, 1959 now abandoned.

This invention relates to the arc welding of low alloy, high yield notch tough steel and particularly to the welding electrode or welding rod, which used with the Inert-Gas Shielded Metallic Arc Welding process (consumable electrode) of Submerged Arc Welding process, materialistically produces gas- and porosity-free, sound, strong, notch tough, ductile weld deposits.

The importance of the brittleness (or lack thereof) of welds under impact or sudden loads and in the presence of a notch has been appreciated for some time. Notches in welded structures cannot be avoided. Any member intersecting another forms a corner sufficient to be classified as a notch. Undesirable brittle behavior results from high stressing or loading at the point of crack initiation. Further, the crack may be propagated, depending upon the temperature and physical characteristics of the weld. Hence, a weld metal composition which exhibits resistance to crack initiation, especially at low temperatures, and resistance to crack propagation at temperatures above the point of crack initiation is desirable.

It is an object of this invention to provide a welding wire or electrode making possible an improved weld metal deposit which resists crack initiation, especially at low temperatures, and resists crack propagation.

It is a further object of this invention to provide such a wire which is suitable for use without flux in the Inert-Gas Shielded Metallic Arc process or with flux in the Submerged Arc Welding process.

Still another object of this invention is to provide a weld which, in contrast to the welds possible heretofore, exhibits notch toughness to greater degrees than the high strength, notch tough structural steels used as base metals.

Generally, it has been determined that a weldment having the superior characteristics described above may be obtained where all of the elements manganese, nickel, titanium, zirconium and aluminum are present in the predominantly iron welding rod and where the quantities of various other elements, i.e., carbon, phosphorus, sulphur and silicon are maintained below certain prescribed levels. The invention also comprises a method of welding wherein the ferritic-type welding wire described is used either with or without a flux to provide a superior weldment.

The welding electrode or welding rod or combination of rod and flux of this invention, when used with either the Inert-Gas Shielded Metallic Arc Welding process or the Submerged Arc Welding process (wherein filler metal may or may not be employed), deposits welds for joining all low alloy steels, and particularly the low alloy high yield notch tough varieties possessing superior impact properties. This notch toughness is exhibited at all temperatures down to and below —200° F. and is believed to extend to levels considerably below —250° F.

The characteristics of the welds obtained are evaluated by the standard Charpy Vee Notch test and Drop Weight test.

The former measures the foot pounds of energy necessary for a fracture to form in the presence of a notch while the latter test is used to evaluate the nil-ductility transition temperature of the weld. Because of the results obtained when the welds of this invention are subjected to the aforementioned tests, and because of the firmly established correlation between the test results and service performance, there is reason to believe that the welds made in high yield, notch tough steel by the methods taught and using the rod described herein will possess unusual resistance to crack initiation at temperatures below —200° F, and exhibit ductile behavior at such temperatures also.

Information regarding suitable rod analyses is set forth in Table I below:

TABLE I.—ELECTRODE COMPOSITION

| Elements | Weight Percent | |
|---|---|---|
| | Permissible Content | Preferred Content |
| Carbon | <0.06 | <0.045 |
| Phosphorus | <0.008 | <0.006 |
| Manganese | 1.0 to 2.50 | 1.25 to 2.00 |
| Sulphur | <0.012 | <0.010 |
| Silicon | <0.40 | <0.30 |
| Chromium | <1.50 | 0.20 to 1.0 |
| Nickel | 1.30 to 3.75 | 1.40 to 3.50 |
| Molybdenum | <1.25 | 0.10 to 1.00 |
| Titanium | 0.003 to 0.10 | 0.01 to 0.08 |
| Zirconium | 0.003 to 0.10 | 0.01 to 0.08 |
| Aluminum | 0.003 to 0.10 | 0.01 to 0.08 |
| Iron | Remainder | Remainder |

The figures set forth were developed following standard Charpy V impact tests run on specimens over a temperature range of —100° F. to +70° F. and Drop Weight tests conducted at temperatures as low as —200° F.

The welding electrode or rod is manufactured generally in the conventional manner to produce an ingot composition with small amounts of tramp or undesirable elements. Alloy additions are made using commercially manufactured materials which may, if desired, be vacuum melted to reduce or remove the tramp elements. The ingot is extruded into rod form and cleaned to remove oxide, scale, slag or other foreign matter on the rod, thus to yield a smooth, bright finish. It is an accepted fact that any reduction in the length of the fracture path produced by inclusions of tramp elements in the weld metal will degrade the notch toughness and scale, slag, oxides or other foreign matter remaining on the electrode or rod will often be deposited in the weld as inclusions.

Factors other than the electrode alloy composition and/or of the deposited weld are also important in securing improved notch toughness, as is well understood. Hence, optimum results, as limited by the present state of knowledge of the art, will be obtained where the process described hereinafter is controlled with respect to these various other features. For example, high current densities are important for improved notch toughness when using the Submerged Arc process. Such greater current densities result in accelerated cooling of the weldment, with the result that better grain adjustment and optimum density are obtained during solidification. Another factor of importance, as is well understood, is the diameter of the welding rod, various sizes being optimum in various applications. As indicated above, these factors must all be taken into consideration when practicing the processes set forth in greater detail below and in utilizing the electrodes of this invention.

The processes in which the aforementioned electrode may be used are each suitable for the protection of the metal from atmospheric contamination at the time of the transfer of the welding electrode or rod in the form of small droplets across the arc gap. However, even where the inert gas shield or slag (provided by a flux) is present, complete protection has been found to be lacking, especially insofar as deleterious oxide and nitride materials are concerned. In accordance with this invention, the effects of these materials are neutralized by the presence of quantities of each of the elements titanium, zirconium and aluminum.

The low phosphorus and sulphur contents have also been discovered to be beneficial in improving the impact properties and notch toughness. Preferably, copper in an amount of 0.10% to 0.20% is added to the rod for grain refinement, thus to achieve an improvement in impact properties and such quantities of copper apparently serve to replace the vanadium customarily found in ferritic-type welding wires. Carbon is reduced to extremely low limits to improve impact properties. A relationship between the manganese, nickel, chromium and molybdenum preferably is observed and the ratio of 8:7:1:2 has been found to be optimum in promoting improved impact properties over a wide temperature range. These last-named four elements are regarded as the principal strengtheners of the alloy composition.

The amount of elements in the weld deposited is expressed as recovery and can be represented as percent recovery. The percent recovery will differ for each element and the percent recovery for each element will differ with each welding process used, as is well understood. It is also common knowledge that powdered elements, metals or alloys, can be added to the flux and incorporated in the deposited weld. Thus, a flux may be formulated which contains various quantities of certain powdered elements, thus to supplement the alloying materials provided by the welding electrode. The flux need not be provided solely as a coating on the electrode, but may be added in the form of the granular flux used with the Submerged Arc Welding process, thus to find its way into the weld metal during the fusion process. Also, any or all of the elements titanium, zirconium and aluminum, may be provided in the flux. They continue to perform satisfactorily as deoxidizers due to their presence at the welding arc even though the percent recovery in the weld deposit, when they are so supplied, is almost negligible. The quantities, however, are increased over those required where these deoxidizers are incorporated in the rod. Necessary quantities are .06% to 2.0% based on the flux weight.

The development of the novel compositions resulted from tests performed on butt joints formed between two pieces of low allow notch tough steel. The abutting edges of the work pieces were purposely spaced a considerable distance apart to remove any doubt as to possible influences from dilution or pickup of elements or metals from the parent metal. The test specimens were dissected from the middle portion of the weld. This is standard procedure for evaluating the performance of weld metal. These welds were radiographed and examination failed to reveal any gross defects. All met Group One Radiographic Standards, NAVSHIPS 250-692-2, Amendment 1.

In one series of tests, the first five examples of weld deposit, designated A to E inclusive, were welded under the following conditions to one-inch thick single V butt joints containing a one-inch root opening with backing straps.

| Amperes | Arc Voltage | Speed (Inches/Minute) |
|---|---|---|
| 325 | 27 | 11.5 |

A 98 percent argon, 2 percent oxygen gas shield was used, containing a low moisture content meeting a −45° F. dew point. A constant flow of this shielding gas was provided the weld at a rate of 50 cubic feet per hour. A constant voltage welding power source was used for welding in the downhand or flat position of welding with a 3/32-inch diameter welding electrode.

The weld metal composition for the five examples is shown in Table II:

TABLE II

| Elements | Deposit | | | | |
|---|---|---|---|---|---|
| | A | B | C | D | E |
| Carbon | 0.03 | 0.02 | 0.02 | 0.02 | 0.02 |
| Manganese | 1.47 | 1.52 | 1.60 | 1.09 | 1.48 |
| Phosphorus | 0.004 | 0.008 | 0.006 | 0.005 | <0.005 |
| Sulphur | 0.007 | 0.006 | 0.010 | 0.009 | 0.006 |
| Silicon | 0.21 | 0.13 | 0.21 | Trace | 0.22 |
| Chromium | 0.19 | 0.55 | 0.25 | 0.30 | 0.36 |
| Nickel | 1.32 | 1.54 | 2.67 | 2.92 | 1.58 |
| Molybdenum | 0.44 | 0.13 | 0.35 | 0.57 | 0.34 |
| Copper | 0.10 | 0.10 | 0.12 | 0.24 | 0.20 |
| Titanium | 0.02 | 0.01 | 0.03 | 0.005 | 0.01 |
| Zirconium | 0.02 | Trace | 0.01 | 0.01 | 0.04 |
| Aluminum | Trace | Trace | 0.02 | .008 | 0.02 |
| Iron | Rem. | Rem. | Rem. | Rem. | Rem. |

The electrode or rod composition for the five examples is shown in Table III. An additional rod composition is reported as electrode F.

TABLE III

| Elements | Electrode | | | | | |
|---|---|---|---|---|---|---|
| | A | B | C | D | E | F |
| Carbon | 0.02 | 0.02 | 0.02 | 0.03 | 0.04 | 0.02 |
| Phosphorous | 0.005 | 0.005 | 0.005 | 0.005 | 0.006 | <.005 |
| Manganese | 1.62 | 1.62 | 1.95 | 1.06 | 1.79 | 1.45 |
| Sulphur | 0.005 | 0.006 | 0.004 | 0.006 | 0.009 | 0.005 |
| Silicon | 0.24 | 0.17 | 0.25 | 0.08 | 0.27 | 0.18 |
| Chromium | 0.21 | 0.60 | 0.19 | 0.25 | 0.25 | 0.24 |
| Nickel | 1.39 | 1.38 | 2.71 | 2.63 | 1.48 | 1.88 |
| Molybdenum | 0.40 | 0.12 | 0.36 | 0.50 | 0.30 | 0.24 |
| Copper | 0.14 | 0.07 | 0.07 | 0.08 | 0.12 | 0.30 |
| Titanium | 0.02 | 0.05 | 0.03 | 0.01 | 0.02 | <0.005 |
| Zirconium | 0.02 | 0.03 | 0.05 | 0.03 | 0.014 | <0.05 |
| Aluminum | 0.02 | 0.08 | 0.07 | 0.08 | 0.03 | <0.01 |
| Iron | Rem. | Rem. | Rem. | Rem. | Rem. | Rem. |

The physical properties of the as-welded all weld standard 0.505-inch diameter tensile specimens were prepared and tested in accordance with Method 211 of Federal Test Method Standard Number 151 and Charpy V specimens were prepared and tested in accordance with Method 221 of Federal Test Standard Number 151, the results for which are shown in Tables IV and V, respectively. The data given represents averages derived from several tests.

TABLE IV

| Weld Deposit | Yield Strength 0.2% Offset, p.s.i. | Ultimate Tensile Strength, p.s.i. | Elongation 2″ (percent) | Reduction of Area (percent) |
|---|---|---|---|---|
| A | 87,200 | 94,700 | 28.5 | 74.4 |
| B | 90,000 | 96,500 | 24.0 | 68.6 |
| C | 101,000 | 108,000 | 22.0 | 54.9 |
| D | 81,500 | 88,500 | 25.0 | 69.3 |
| E | 85,000 | 93,500 | 27.5 | 71.8 |
| F | 88,000 | 96,000 | 26.0 | 70.6 |

TABLE V

*Charpy V Impact Properties*

[Foot/Pounds]

| Weld Deposit or Electrode | −100 | Temperature, °F. | | |
|---|---|---|---|---|
| | | −60 | 0 | +70 |
| A | | *92 | *112 | *165 | *197 |
| B | | *8 | *59 | *130 | *157 |
| C | | *16 | *50 | | *112 |
| D | | *18 | *41 | *65 | *135 |
| E | | *86 | *118 | *194 | *197 |
| F | | *37 | *105 | *132 | *142 |

*Notch orientation in relation to the weld nugget was located in the center of the weld and in upper half portion, parallel to surface; the same conditions obtained in all tests reported hereinafter.

Standard or normal single and double V butt joints in a low alloy notch tough steel produced welds which were sound in every respect and radiographic analysis revealed that weld density conformed to the minimum requirements of Group One, X-ray Standards of NAV-SHIPS 250–692–2, Amendment 1. Transverse tensile specimens removed from these test plates revealed that the weld metal overmatched the base metal in strength since all the failures occurred in the parent metal plate outside of the weld and heat affected zone area.

While most of the work done with the invention was confined to the flat or downhand position of welding, satisfactory welds have been made with a 0.035-inch diameter electrode and welded in the vertical position traveling uphill. The welding rod or electrode numbers A and B were used for this evaluation. A short or close arc technique was used with a constant voltage power source. A dynamic reactance was placed in series with the welding current to stabilize and steady the erratic arc experienced with low voltage welding. Satisfactory performance under production conditions has been exhibited with this method.

It has been found that under production conditions some advantages are gained with the use of the submerged Arc Welding process (See U.S. Patent 2,532,411) over the Inert-Gas Shielded Metal Arc Welding process (See U.S. Patent 2,727,125). The Inert-Gas Shield of argon, carbon dioxide or mixtures thereof, used with the Inert-Gas Shielded Metal Arc Welding process, must be protected from drafts or air currents. These atmospheric disturbances of the inert-gas envelope around the weld cause weld metal contamination with absorbtion of harmful gases, such as oxygen, nitrogen and hydrogen. The use of flux coated electrodes or granular flux with the Submerged Arc process is more versatile in this respect since welding is possible under similar conditions without deleterious effects on the weld. The inherent coverage of the weld with flux or slag with use of the Submerged Arc Welding process has the additional desirable features of complete protection of the workmen from the injurious effects of infrared and ultraviolet light. Protective clothing must be worn by welders operating the Inert-Gas Shielded Metal Arc process. Other workmen must also be protected by suitable means when working in proximity.

Where it might ordinarily be expected that there would be a lowering of the impact properties where flux is used, it has been observed that the weld strength is unaffected where this invention is practiced. That is, if the weld strength is affected, it is not recognizable using the standard tensile test bar. Another factor which must be considered is the slower cooling rate afforded a weld covered with slag. However, it has been discovered that by increasing the current density and decreasing the heat input, as measured in joules per inch, a cooling rate approaching that of the Inert-Gas Shielded Metal Arc Welding process is achieved. By use of the technique, improvement in the impact properties of the weld metal has been made. The next two runs reported, designated E' and F, (Table VI) were made under the following conditions using one-inch thick high yield strength notch tough steel employing a double V butt joint. Electric welding current was supplied from a constant voltage power source with a 3/32-inch diameter electrode, the welds deposited in a flat or downhand position.

| Amperes | Arc Voltage | Speed (Inches/Minute) |
|---|---|---|
| 500 | 30 | 17 |

TABLE VI

| Elements | Percent by Weight | |
|---|---|---|
| | Deposit E' | Deposit F |
| Carbon | 0.06 | 0.07 |
| Manganese | 1.06 | 1.15 |
| Phosphorus | 0.013 | 0.008 |
| Sulphur | 0.012 | 0.016 |
| Silicon | 0.45 | 0.38 |
| Chromium | 0.53 | 0.59 |
| Nickel | 2.43 | 2.43 |
| Molybdenum | 0.38 | 0.26 |
| Copper | 0.15 | 0.09 |
| Titanium | <0.01 | 0.01 |
| Zirconium | <0.01 | 0.01 |
| Aluminum | <0.01 | 0.03 |
| Iron | Remainder | Remainder |

Deposit E' was welded with Electrode A, the analysis for which is shown in Table III. Deposit F was welded with Electrode C, the analysis for which is also shown in Table III. Both weld deposits were made with the novel flux composition shown in Table VII:

TABLE VII

Element: Composition percent by weight

Calcium oxide _____ 18.50
Silicon oxide _____ 24.00
Aluminum oxide _____ 19.05
Nickel _____ 0.65
Magnesium oxide _____ 5.00
Manganese _____ 4.00
Ferrous oxide _____ 3.20
Chromium _____ 0.20
Sodium carbonate _____ 1.50
Zirconium oxide _____ 12.75
Sodium oxide _____ 6.25
Calcium fluoride _____ 5.25

The next example of weld deposit, Deposit G, Table VIII, was welded with Electrode A, the analysis for which is shown in Table III. The weld was made under the following conditions in one-inch thick high yield strength notch tough steel plate using a single V butt joint with a one-inch root opening and backing strap.

| Amperes | Arc Voltage | Speed (Inches/Minute) |
|---|---|---|
| 425 | 27 | 16 |

TABLE VIII

Elements: Deposit G, composition percent by weight

Carbon _____ 0.04.
Manganese _____ 1.38.
Phosphorus _____ 0.014.
Sulphur _____ 0.004.
Silicon _____ 0.53.
Chromium _____ 0.27.
Nickel _____ 3.84.
Molybdenum _____ 0.36.
Copper _____ 0.10.
Titanium _____ 0.01.
Zirconium _____ Nil.
Aluminum _____ 0.03.
Iron _____ Remainder.

The deposit shown in Table VIII was made with the flux composition of the Linde Air Products designated Type 6C48. The physical properties for weld Deposits E' and F' of the as welded, transverse, standard 0.505-inch diameter tensile specimens were prepared and tested in accordance with Method 211 of Federal Test Method Standard Number 151 and the results are as shown in Table IX, the data given being averages derived from several tests:

TABLE IX

| Weld Deposit | Yield Strength 0.2% Offset, p.s.i. | Ultimate Tensile Strength, p.s.i. | Average Elongation 2" (percent) | Average Reduction of Area (percent) |
|---|---|---|---|---|
| E' | 83,000 | 99,500 | 23.0 | 72.6 |
| F' | 84,500 | 102,000 | 21.5 | 71.1 |

In the case of Deposits E' and F', the weld metal was superior to the base metal in strength. Fractures occurred in the base metal plate outside of the weld and heat affected zone. Deformation and reduction of area was confined to the base metal for the most part. Impact properties of the weld metal were prepared and tested in accordance with Method 221 of Federal Test Method Standard Number 151 for Weld Deposit E' and F and the results shown in Table X.

In the table above, it will be noted that reference is made to "Yield Strength." This is the engineering close approximation of the number of pounds required to cause the weld to cease behaving elastically. Reference is also made to "Ultimate Tensile Strength," which is the number of pounds required to sever the weld, while the "Percent Elongation" is a measurement of the ductility of the weld determined by measuring the difference between the original length and length after fracture. Finally, the "Reduction of Area" referred to in the table above indicates the percentage decrease in diameter of the weld specimen at the point of the weld fracture, induced by elongating the specimen. The notch toughness of weld metal under the designation "Charpy V Impact Properties" is the measure of energy absorbed in foot lbs. under impact loading of test specimens having a V notch.

TABLE X

*Charpy V Impact Properties*

AVERAGE FOOT POUNDS (SEVERAL TESTS OF EACH DEPOSIT AT EACH TEMPERATURE)

| Weld Deposit | −100 | Temperature, ° F. | | |
|---|---|---|---|---|
| | | −60 | 0 | +70 |
| E' | 32 | 38 | 44 | 53 |
| F' | (*) | (*) | (*) | 50 |

*Insufficient material for tests.

The physical properties for Weld Deposit G of the as-welded, all weld standard 0.505-inch diameter tensile specimens were prepared and tested in accordance with Method 211 of Federal Test Method Standard Number 151 and the results shown in Table XI, the data given being averages derived from several tests:

TABLE XI

| Weld Deposit | Yield Strength 0.2% Offset, p.s.i. | Ultimate Tensile Strength, p.s.i. | Elongation 2" (percent) | Reduction of Area (percent) |
|---|---|---|---|---|
| G | 103,800 | 111,000 | 20.3 | 56.0 |

Impact properties of the weld metal Deposit G were prepared and tested in accordance with Method 221 of Federal Test Method Standard Number 151 and the results shown in Table XII:

TABLE XII

*Charpy V Impact Properties*

AVERAGE FOOT POUNDS (SEVERAL TESTS OF EACH DEPOSIT AT EACH TEMPERATURE)

| Weld Deposit | −100 | Temperature, ° F. | | |
|---|---|---|---|---|
| | | −60 | 0 | +70 |
| G | 28 | 37 | (*) | 55 |

*Insufficient material for tests.

The evaluation of the tests performed for the Weld Deposits A to G inclusive were made on high yield strength notch tough steel.

Normal stress relieving techniques, especially tempering treatment, may be employed with any of weld metal compositions A to G inclusive without seriously lowering the impact properties of the weld, the normal holding time at an elevated temperature below the critical temperature being about one hour per inch of thickness.

The weld deposits and electrodes of this invention are particularly designed for use with high yield strength, notch tough steels. Obviously, because of the relatively higher cost of the improved welds of this invention, it is generally impractical to use them with steels exhibiting substantially lesser degrees of notch toughness. Typical steels intended for use in the practice of this invention are the following:

Steel plate, alloy, high yield strength, Military Specification MIL–S–16216D, which contains, by weight, about 0.23% carbon, about 0.35% manganese, about 0.030% phosphorus, about 0.035% sulphur, about 0.32% silicon, about 3.25% nickel, about 1.80% chromium, about 0.55% molybdenum.

Steel plate, alloy, high strength, U.S. Steel T–1, containing, by weight, about 0.15% carbon, about 0.75% manganese, about 0.026% phosphorus, about 0.30% sulphur, about 0.24% silicon, about 0.85% nickel, about 0.50% chromium, about 0.45% molybdenum, about 0.05% vanadium, about 0.31% copper, about 0.0029% boron.

Steel, alloy, high yield strength, S.A.E. 4140, containing, by weight, about 0.40% carbon, about 1.00% manganese, about 0.40% phosphorus, about 0.32% sulphur, about 0.33% silicon, about 1.05% chromium, about 0.23% molybdenum.

Steel, alloy, high yield strength, N–A–XTRA, containing, by weight, about 0.14% carbon, about 0.80% manganese, about 0.024% sulphur, about 0.014% phosphorus, about 0.65% silicon, about 0.58% chromium, about 0.15% molybdenum, about 0.07% zirconium.

It may be said that the weld electrodes and processes of this invention are especially suitable for high yield steels having ingredients, in addition to iron, falling within the ranges set forth in the table below.

TABLE XIII

| Elements: | Percent by weight, Range of Composition |
|---|---|
| Carbon | 0.01 to 0.40 |
| Manganese | 0.10 to 2.00 |
| Phosphorus | 0 to 0.04 |
| Sulphur | 0 to 0.045 |
| Silicon | 0.12 to 0.70 |
| Molybdenum | 0.13 to 0.70 |
| Chromium | 0.04 to 2.50 |
| Nickel | 0.05 to 4.50 |
| Copper | 0 to .50 |
| Titanium | 0 to .25 |
| Zirconium | 0 to .25 |
| Vanadium | 0 to .15 |
| Tungsten | 0 to .10 |
| Boron | 0 to .0050 |

I claim:

1. A method of welding a low alloy, high yield, notch tough steel containing by weight, about 0.40% maximum carbon, about 0.10% to 2.00% manganese, about 0.04% maximum phosphorus, about 0.045% maximum sulphur, about 0.12% to 0.70% silicon, about 0.04% to 2.50% chromium, about 0.05% to 4.5% nickel, about 0.13% to 0.70% molybdenum and the remainder substantially iron, said method comprising: rooting an electric welding arc to said work piece and feeding a welding wire to said arc, said wire containing, by weight, about 0.06% maximum carbon, about 0.008% maximum phosphorus, about 0.012% maximum sulphur, about 0.40% maximum silicon, about 1.00% to 2.50% manganese, about 1.30% to 3.75% nickel, about 1.50% maximum chromium, about 1.25% maximum molybdenum, about 0.003% to 0.10% titanium, about 0.003% to 0.10% zirconium and about 0.003% to 0.10% aluminum, the remainder being substantially iron; blanketing said arc and the consuming end of the electrode whereby to exclude air and advancing said electrode to maintain the arc as electrode material is transferred from the electrode to said metal.

2. The method of claim 1 wherein said arc and the consuming end of said electrode are blanketed with a gas stream composed substantially entirely of a gas selected from the class consisting of carbon dioxide, argon and mixtures thereof, a small quantity of oxygen being mixed therewith.

3. The method of claim 1 wherein said arc and the consuming end of said electrode are blanketed with a flux material.

4. A method of welding a low alloy, high yield, notch tough steel containing by weight, about 0.40% maximum carbon, about 0.10% to 2.00% manganese, about 0.04% maximum phosphorus, about 0.045% maximum sulphur, about 0.12% to 0.70% silicon, about 0.04% to 2.50% chromium, about 0.05% to 4.5% nickel, about 0.13% to 0.70% molybdenum and the remainder substantially iron, said method comprising: rooting an electric welding arc to said work piece and feeding a welding wire to said arc, said wire containing, by weight, about 0.045% maximum carbon, about 0.006% maximum phosphorus, about 0.010% maximum sulphur, about 0.30% maximum silicon, about 1.25% to 2.00% manganese, about 0.20% to 1.00% chromium, about 1.40% to 3.50% nickel, about 0.10% to 1.00% molybdenum, about 0.01% to 0.08% of each of the metals titanium, zirconium and aluminum and the remainder substantially iron; blanketing said arc and the consuming end of the electrode whereby to exclude air and advancing said electrode to maintain the arc as electrode material is transferred from the electrode to said metal.

5. The method of claim 4 wherein said arc and the consuming end of said electrode are blanketed with a gas stream composed substantially entirely of a gas selected from the class consisting of carbon dioxide, argon and mixtures thereof, a small quantity of oxygen being mixed therewith.

6. The method of claim 4 wherein said arc and the consuming end of said electrode are blanketed with a flux material.

7. A ferritic-type weld wire for welding low alloy, high yield, notch tough steel comprising: a ferrous alloy containing, by weight, about 0.06% maximum carbon, about 0.008% maximum phosphorus, about 0.012% maximum sulphur, about 0.40% maximum silicon, about 1.00% to 2.50% manganese, about 1.30% to 3.75% nickel, about 1.50% maximum chromium, about 1.25% maximum molybdenum, about 0.003% to 0.10% titanium, about 0.003% to 0.10% zirconium and about 0.003% to 0.10% aluminum, the remainder being substantially iron.

8. A ferritic-type weld wire for welding low alloy, high yield, notch tough steel comprising: a ferrous alloy containing, by weight, about 0.045% maximum carbon, about 0.006% maximum phosphorus, about 0.010% maximum sulphur, about 0.30% maximum silicon, about 1.25% to 2.00% manganese, about 0.20% to 1.00% chromium, about 1.40% to 3.50% nickel, about 0.10% to 1.00% molybdenum, about 0.01% to 0.08% of each of the metals titanium, zirconium and aluminum and the remainder substantially iron.

9. A ferritic-type weld wire for welding low alloy, high yield, notch tough steel comprising: a ferrous alloy wire containing, by weight, about 0.02% carbon, about 0.005% phosphorus, about 0.005% sulphur, about 0.24% silicon, about 1.62% manganese, about 0.21% chromium, about 0.40% molybdenum, about 1.39% nickel, about 0.14% copper, about 0.02% titanium, about 0.02% zirconium, about 0.02% aluminum and the remainder substantially iron.

10. A ferritic-type weld wire for welding low alloy, high yield, notch tough steel comprising: a ferrous alloy wire containing, by weight, about 0.02% carbon, about 0.005% phosphorus, about 0.006% sulphur, about 0.17% silicon, about 1.62% manganese, about 0.60% chromium, about 0.12% molybdenum, about 1.38% nickel, about 0.07% copper, about 0.05% titanium, about 0.03% zirconium, about 0.08% aluminum and the remainder substantially iron.

11. A ferritic-type weld wire for welding low alloy, high yield, notch tough steel comprising: a ferrous alloy wire containing, by weight, about 0.02% carbon, about 0.005% phosphorus, about 0.004% sulphur, about 0.25% silicon, about 1.95% manganese, about 0.19% chromium, about 0.36% molybdenum, about 2.71% nickel, about 0.07% copper, about 0.03% titanium, about 0.05% zirconium, about 0.07% aluminum and the remainder substantially iron.

12. A ferritic-type weld wire for welding low alloy, high yield, notch tough steel comprising: a ferrous alloy wire containing, by weight, about 0.03% carbon, about 0.005% phosphorus, about 0.006% sulphur, about 0.08% silicon, about 1.06% manganese, about 0.25% chromium, about 0.50% molybdenum, about 2.63% nickel, about 0.08% copper, about 0.01% titanium, about 0.03% zirconium, about 0.08% aluminum and the remainder substantially iron.

13. A ferritic-type weld wire for welding low alloy, high yield, notch tough steel comprising: a ferrous alloy wire containing, by weight, about 0.04% carbon, about 0.006% phosphorus, about 0.009% sulphur, about 0.27% silicon, about 1.79% manganese, about 0.25% chromium, about 0.30% molybdenum, about 1.48% nickel, about 0.12% copper, about 0.02% titanium, about 0.014% zirconium, about 0.03% aluminum and the remainder substantially iron.

14. A method of welding a low alloy, high yield, notch tough steel containing by weight about 0.40% maximum carbon, about 0.10% to 2.00% manganese, about 0.04% maximum phosphorus, about 0.045% maximum sulphur, about 0.12% to 0.70% silicon, about 0.04% to 2.50% chromium, about 0.05% to 4.5% nickel, about 0.13% to 0.70% molybdenum and the remainder substantially iron, said method comprising: rooting an electric welding arc to said work piece and feeding a welding wire to said arc, said wire containing, by weight, about 0.045% maximum carbon, about 0.006% maximum phosphorus, about 0.010% maximum sulphur, about 0.30% maximum silicon, about 1.25% to 2.00% manganese, about 0.20% to 1.00% chromium, about 1.40% to 3.50% nickel, and about 1.10% to 1.00% molybdenum, the remainder being substantially iron, blanketing said arc and the consuming end of the electrode with a flux material whereby to exclude air, said flux material containing between about 0.01% and 0.08% of each of the metals titanium, zirconium and aluminum; and advancing said electrode to maintain the arc as electrode material is transferred from said electrode to said metal.

References Cited in the file of this patent

UNITED STATES PATENTS

| | | |
|---|---|---|
| 2,823,992 | Bolkcom et al. | Feb. 18, 1958 |
| 2,985,747 | Kutchera | May 23, 1961 |
| 3,031,568 | Turner | Apr. 24, 1962 |
| 3,055,755 | Schelling et al. | Sept. 25, 1962 |
| 3,110,798 | Keay | Nov. 12, 1963 |